(12) United States Patent
Black et al.

(10) Patent No.: US 11,558,419 B2
(45) Date of Patent: Jan. 17, 2023

(54) METHOD AND APPARATUS FOR AUTONOMOUS IDENTIFICATION OF SIMILAR AND ADJACENT ATTACKS BASED ON DETECTED ATTACKS

(71) Applicant: Barracuda Networks, Inc., Campbell, CA (US)

(72) Inventors: Christopher B. Black, San Jose, CA (US); Grayson Carr, Cumming, GA (US); Jordan A. Petersen, San Jose, CA (US); Benjamin J. Hildebrand, Los Gatos, CA (US)

(73) Assignee: Barracuda Networks, Inc., Campbell, CA (US)

( * ) Notice: Subject to any disclaimer, the term of this patent is extended or adjusted under 35 U.S.C. 154(b) by 218 days.

(21) Appl. No.: 16/898,431

(22) Filed: Jun. 10, 2020

(65) Prior Publication Data

US 2021/0136107 A1    May 6, 2021

Related U.S. Application Data

(60) Provisional application No. 62/929,597, filed on Nov. 1, 2019.

(51) Int. Cl.
*H04L 29/06* (2006.01)
*H04L 9/40* (2022.01)
*H04L 51/212* (2022.01)

(52) U.S. Cl.
CPC ........ *H04L 63/1466* (2013.01); *H04L 51/212* (2022.05); *H04L 63/123* (2013.01); *H04L 63/1416* (2013.01); *H04L 63/1425* (2013.01); *H04L 63/168* (2013.01)

(58) Field of Classification Search
CPC ... H04L 63/1466; H04L 51/12; H04L 63/123; H04L 63/1416; H04L 63/1425; H04L 63/168; H04L 63/1433; H04L 63/1408; H04L 51/212
See application file for complete search history.

(56) References Cited

U.S. PATENT DOCUMENTS

| | | | |
|---|---|---|---|
| 10,284,587 B1 * | 5/2019 | Schlatter | H04L 63/1433 |
| 2013/0091574 A1 * | 4/2013 | Howes | G06F 21/554 |
| | | | 726/25 |
| 2018/0097841 A1 * | 4/2018 | Stolarz | H04L 63/1441 |
| 2020/0358820 A1 * | 11/2020 | Kolingivadi | H04L 63/1425 |

* cited by examiner

*Primary Examiner* — Yogesh Paliwal

(57) ABSTRACT

A new approach is proposed to support autonomous similar and adjacent attack identification. First, an incident is created for a detected suspicious electronic message-borne attack at one user account with one tenant on an electronic communication platform. A plurality of insight events for similar or adjacent attacks are then generated automatically based on the detected attack and inserted into an insights queue. For each of the insight events in the insights queue, a search is conducted in a repository to identify a set of un-remediated attacks against user accounts of the same or different tenants on the electronic communication platform, wherein the set of un-remediated attacks are similar or adjacent to the detected attack. Insights on the identified un-remediated attacks against the user accounts in the same or different tenants that are similar or adjacent to the detected attack are automatically generated for an administrator and are remediated accordingly.

26 Claims, 3 Drawing Sheets

METHOD AND APPARATUS FOR AUTONOMOUS IDENTIFICATION OF SIMILAR AND ADJACENT ATTACKS BASED ON DETECTED ATTACKS

CROSS-REFERENCE TO RELATED APPLICATIONS

This application claims the benefit of U.S. Provisional Patent Application No. 62/929,597, filed Nov. 1, 2019, and entitled "Autonomous Identification of Similar and Adjacent Attacks Based on Detected Threats," which is incorporated herein in its entirety by reference.

BACKGROUND

The massive expansion of Internet usage that has occurred since the mid-1990's has spawned a corresponding increase in cyber attacks, which may be broadly defined as any attack that involves an electronic device and a network (including particularly the Internet). Many of the cyber attacks are electronic message-borne, wherein the attacks are carried out via malicious electronic messages that include but are not limited to emails, text messages, instant messages, online chats on a social media platform, voice messages or mails that are automatically converted to be in an electronic text format, or other forms of electronic communications. These malicious electronic messages evade security check points (e.g., firewalls at gateways) of an internal network of an entity/organization and land in inboxes of users' account at the entity. The electronic communication system at the entity need to respond quickly and accurately to the electronic message-borne attacks to prevent increase in damage and to limit the spread of the attacks via forensics (after the fact) analysis and incident response.

Forensics and incident response to the electronic message-borne attacks often relies on users' reporting of suspicious electronic messages for an administrator of the entity's electronic communication system to be aware of the new electronic message-borne attacks/threats to the users in the organization. One of the challenges with the reporting of suspicious electronic messages is that the malicious parties that initiated those electronic message-borne attacks often tend to vary the contents of their attacks to obfuscate detection by forensics analysis. As a result, when trying to remediate an incident of an electronic message-borne attack, the administrator may miss the scope of the attack within the entity's network, which may lead to untold monetary and legal consequences for the entity. Due to the evolving nature of the vectors/variables/varying factors of the electronic message-borne attack, it is critical for the administrators to fully comprehend the extent of an attack inside their entities and remediate threats in a timely manner.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
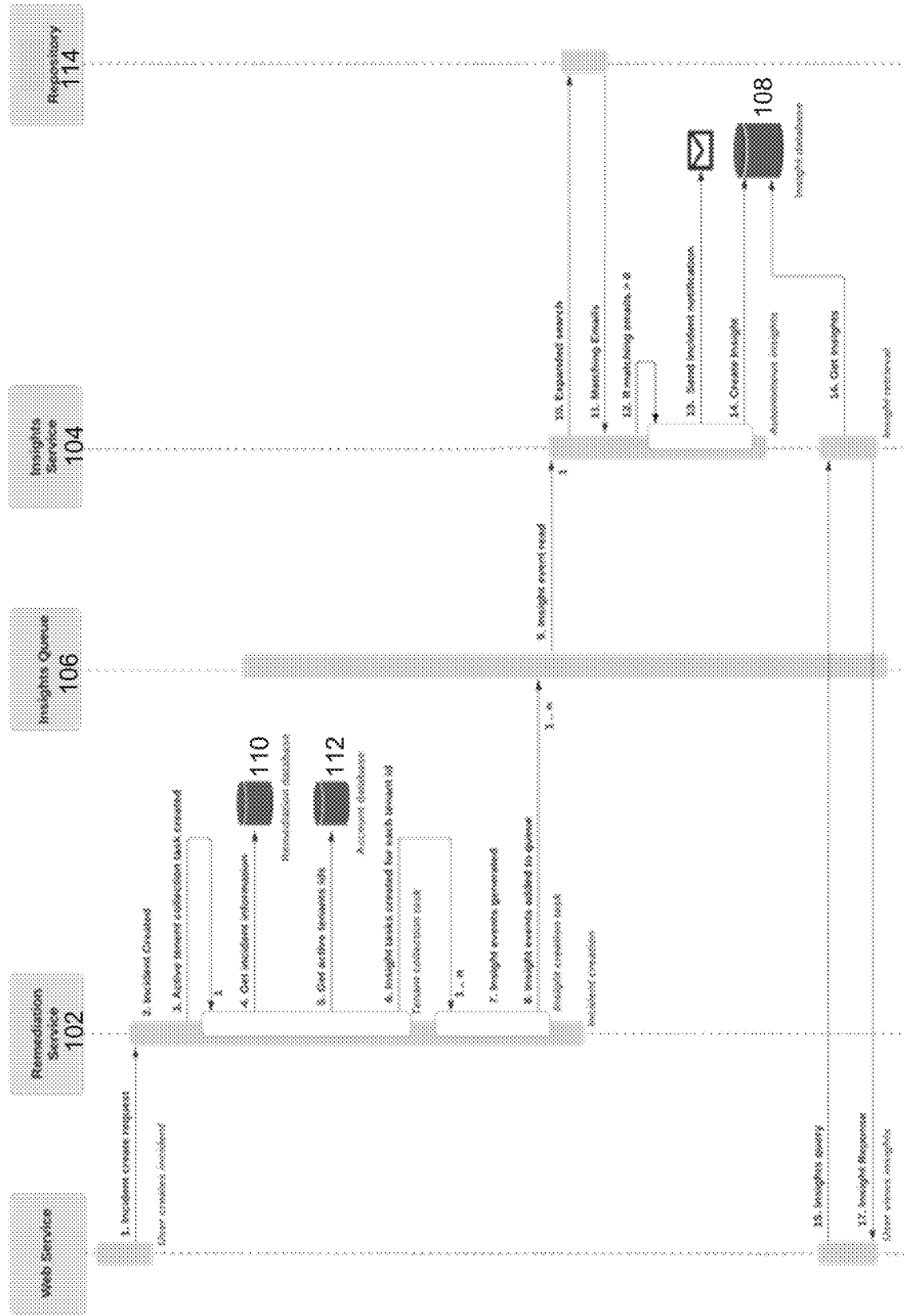
FIG. 1 depicts an example of a system diagram of a system that supports autonomous similar and adjacent attack identification according to some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support autonomous similar and adjacent attack identification. First, an incident is created for a detected suspicious attack via an electronic message at one user account with one tenant on an electronic communication platform, wherein the electronic message in one of an email, a text message, an instant message, an online chat (e.g., on a social media platform), a voice message converted to an electronic text format, or another form of electronic communication. A plurality of insight events for similar or adjacent attacks are then generated automatically based on the detected attack and inserted into an insights queue. For each of the plurality of insight events in the insights queue, a search is conducted in a repository to identify a set of un-remediated attacks against user accounts of the same or different tenants on the electronic communication platform, wherein the set of un-remediated attacks are similar or adjacent to the detected attack. If the set of un-remediated attacks is identified, insights on such un-remediated attacks similar or adjacent to the detected attacks are automatically generated and reported to an demonstrator wherein the set of un-remediated attacks against the user accounts in the same or different tenants on the electronic communication platform that are similar or adjacent to the detected attack are remediated.

By enabling autonomous attack identification, the proposed approach provides system/network administrators of entities the power to look beyond the original scope of a detected electronic message-borne attack and to be able to fully remediate the impact of the attack by removing all related attacks and/or potential threats from the entity. As a result, the proposed approach enables the administrators to quickly identify the nature and scope of the attack, immediately eliminate malicious electronic messages that are relevant, and carry out remediation actions rapidly to halt the attack's progress and minimize its damages.

FIG. 1 depicts an example of a system diagram 100 of a system that supports autonomous similar and adjacent attack identification. Although the diagrams depict components as functionally separate, such depiction is merely for illustrative purposes. It will be apparent that the components portrayed in this figure can be arbitrarily combined or divided into separate software, firmware, and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a remediation service/engine 102, an insights service/engine 104, an insights queue 106, an insights database 108, a remediation database 110, an account database 112, and an electronic message repository (or simply repository) 114. Each of these components of the system 100 runs on a host, which includes one or more processors with software instructions stored in a storage unit such as a non-volatile memory (also referred to as secondary memory) of the host for practicing one or more processes. When the software instructions are executed by the one or more processors of the host, at least a subset of the software instructions is loaded into a memory unit (also referred to as primary memory) by the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits. In some embodiments, each host can be a computing device, a communication device, a storage device, or any computing device capable of running a software component. For non-limiting examples, a computing device can be but is not limited to a server computer, a laptop computer, a desktop computer, a tablet, a Google Android device, an iPhone, an iPad, a set-top box, a video game console, an Internet of Things (IoT) device, and a voice-controlled speaker or controller. Each host has a communication interface (not shown), which enables the engines to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, mobile communication network, corporate network, enterprise network, campus network etc. The physical connections of the network and the communication protocols are well known to those of skill in the art.

In the example of FIG. 1, the remediation engine 102 is configured to process incidents of cyber attacks such as electronic message-borne attacks in the form of suspicious electronic messages received by users within one or more entities/organizations (also referred to as tenants) on the same electronic communication platform. The remediation engine 102 is then configured to take remediation action(s) against the incidents to limit damage to the user accounts and to prevent the attacks from spreading to other users among the entities. First, the remediation engine 102 is configured to accept an incident creation request from an administrator of the electronic communication platform who detects a suspicious attack at one user account, wherein the incident creation request may be submitted by the administrator via a client side web-based application/service. In some embodiments, the suspicious attack is carried out in the form of an email, a text message, an instant message arrived at the user account. In some embodiments, the suspicious attack is voice-based and is carried out in the form of a voice mail or message received at the user account, wherein the voice mail or message is then automatically converted to be in a text format for the user and/or the administrator to review. In some embodiments, the remediation engine 102 is configured to utilize an entire pool of related data of the attack (knowledge from the past and/or behind the scene) stored in the remediation database 110 of incidents of attacks happened in the past or behind the scenes to identify or detect the attack received at the one user account. The remediation engine 102 then creates an incident for the attack upon the administrator's request and collect electronic messages related to the incident from the repository 114. Here, the repository 114 is a datastore that maintains metadata and content of the electronic messages received by users within a plurality of tenants on the electronic communication platform. In some embodiments, the repository 114 is a cloud-based archiving service that enables the administrator to securely preserve, search, and access electronic communications in the cloud.

In some embodiments, the remediation engine 102 is configured to automatically generate a plurality of insight events/tasks based on the incident for the attack and insert the plurality of insight events to the insights queue 106, wherein each insight event is aimed at providing certain insight into the other similar or adjacent attacks related to the attack. Here, the insights queue 106 is a queuing service/component wherein the plurality of insight events are placed into by the remediation engine 102 and removed by the insights engine 104 in a first in first out (FIFO) order. In some embodiments, the insights queue 106 is a distributed message queuing service that supports programmatic sending of messages via web service applications as a way to communicate over the Internet, e.g., Amazon Simple Queue Service (SQS). In some embodiments, the remediation engine 102 is configured to retrieve a set of active tenant identifications/IDs and related account data from the account database 112 one at a time and create one insight event for each of the active tenant identifications in order to gain insights on attacks happening in those tenants as discussed in details below.

Figure 2A:
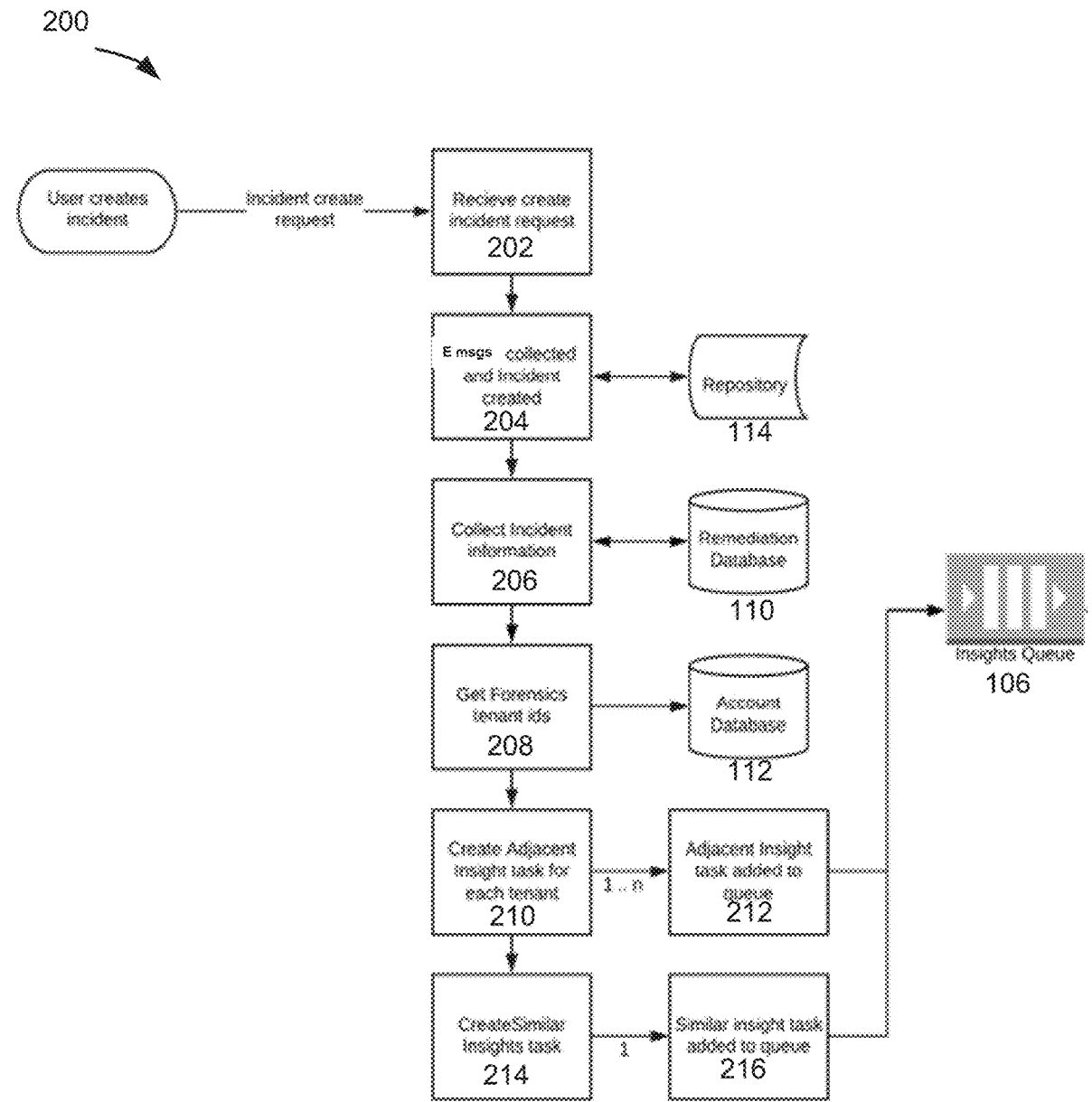
FIG. 2A depicts a flowchart of an example of a process to support automatically generating a plurality of insight events based on an incident of a detected attack according to some embodiments.

FIG. 2A depicts a flowchart 200 of an example of a process to support automatically generating a plurality of insight events based on an incident of a detected attack. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2A, the flowchart 200 starts at step 202, where a request to create an incident for a detected attack is received. At step 204, the incident for a detected attack is created and relevant electronic messages are retrieved from the repository 114. The incident is then saved to the remediation database 110 and relevant incident information is collected at step 206. At step 208, the identifications of other tenants on the same electronic communication platform were retrieved from the account database 112. An adjacent insight task is created for each of these tenants at step 210 based on their IDs and added to the insights queue 106 at step 212. A similar insights task is also created at step 214 and added to the insights queue 106 at step 216.

In the example of FIG. 1, the insights engine 104 is configured to retrieve and process each of the insight events from the insights queue 106 to automatically generate insights on other attacks that are related to the incident for the attack. In some embodiments, the insights engine 104 is configured to save and maintain the automatically-generated insights in the insights database 108. In some embodiments, the automatically-generated insights can inform an organization of attacks that may not have been reported or detected by the administrators/users. As such, the automatically-generated insights can greatly reduce the time unknown or undetected malicious content may reside inside an entity's system and thus reduce the chance and potential damage that an attack can cause to the entity. In some embodiments, the insights engine 104 is configured to retrieve the automatically-generated insights from the insight database 108 and to provide such insights to the administrator upon a query or request by the administrator.

In some embodiments, two types of insights are automatically generated—similar insights on attacks similar to the detected attack and adjacent insights. For similar insight, once the incident of the malicious attack is detected at the one user account, the insights engine 104 is configured to conduct an expanded search for attacks related to the incident of the detected attack inside the entity/tenant by adjusting the search criteria to include and detect similar threats and/or attacks happened in the past in the entity that have been missed. Here, these similar attacks may happen in accounts owned by other users in the entity based on likelihood that these accounts may face similar attacks. In some embodiments, the similar attacks may be originated by different senders from the same domain or a different domain from the incident of attack. In some embodiments, the similar attacks may not be exactly identical to the incident of the detected attack that just happened and the search criteria for identifying the similar attacks may be loosened or expanded to include variance of the detected attack in order to search for attacks in other user accounts that may be affected/hacked. In some embodiments, the loosened search criteria may cover similarity in a set of electronic message characteristics. For emails or text messages, such characteristics include but are not limited to sender and/or recipient address, content pattern, intent, type, etc. For voice messages, such characteristics include but are not limited to frequency, tone, or speed of the voice messages, etc. If un-remediated malicious electronic messages are found during the search, the insights engine 104 is configured to create a similar insight for immediate remediation of these un-remediated malicious electronic messages by the remediation engine 102 and send a notification about these threats to the administrator. Since the administrator generally only has a fraction of the information of the scope of an electronic message-borne attack, such similar insight provides the administrator the power to look beyond the scope of the original incident of the attack and to be able to fully remove previously uncovered threats from the organization's internal network environment.

Since attackers generally use similar attack vectors and/or parameters against multiple entities/organizations to increase the chances of a successful attack, the incident of the attack might not be unique to the entity of the attack where it is detected as similar attacks may be happening in other entities globally on a broader scale as well. For a non-limiting example, the other accounts may be within the same organization/entity as the detected attacked account or belong to a different organization/entity that is also monitored by the administrator for similar attacks. For adjacent insight, the insights engine 104 is configured to conduct an expanded search of the entire repository 114 containing electronic messages and communications at multiple entities/organizations/tenants to identify the same or similar attacks like the incident of the detected attack that may have happened at other tenants on the same electronic communication platform. If a positive match of un-remediated malicious electronic messages are found at other tenants, the insights engine 104 is configured to create an adjacent insight for immediate remediation of the un-remediated malicious electronic messages found at other tenants by the remediation engine 102 and notify the administrator of these threat across the tenants. By informing all tenants that may be affected by an electronic message-borne attack, adjacent insights have the potential to stop an industry-specific attack targeting a group of entities in the industry in its track.

In some embodiments, once the other accounts being attacked in the same or different entities have been identified, the remediation engine 102 is configured to take one or more remedial measures against the attacks to these accounts. In some embodiments, the remediation engine 102 is configured to notify the users of these accounts promptly. In some embodiments, the remediation engine 102 is configured to preemptively prevent attacks on those accounts before they actually happen or cause any damages to the users by taking the one or more remedial measures. In some embodiments, the remediation engine 102 is configured to mitigate the attacks in a similar fashion as the accounts where similar attacks have been detected and mitigated in the past.

Figure 2B:
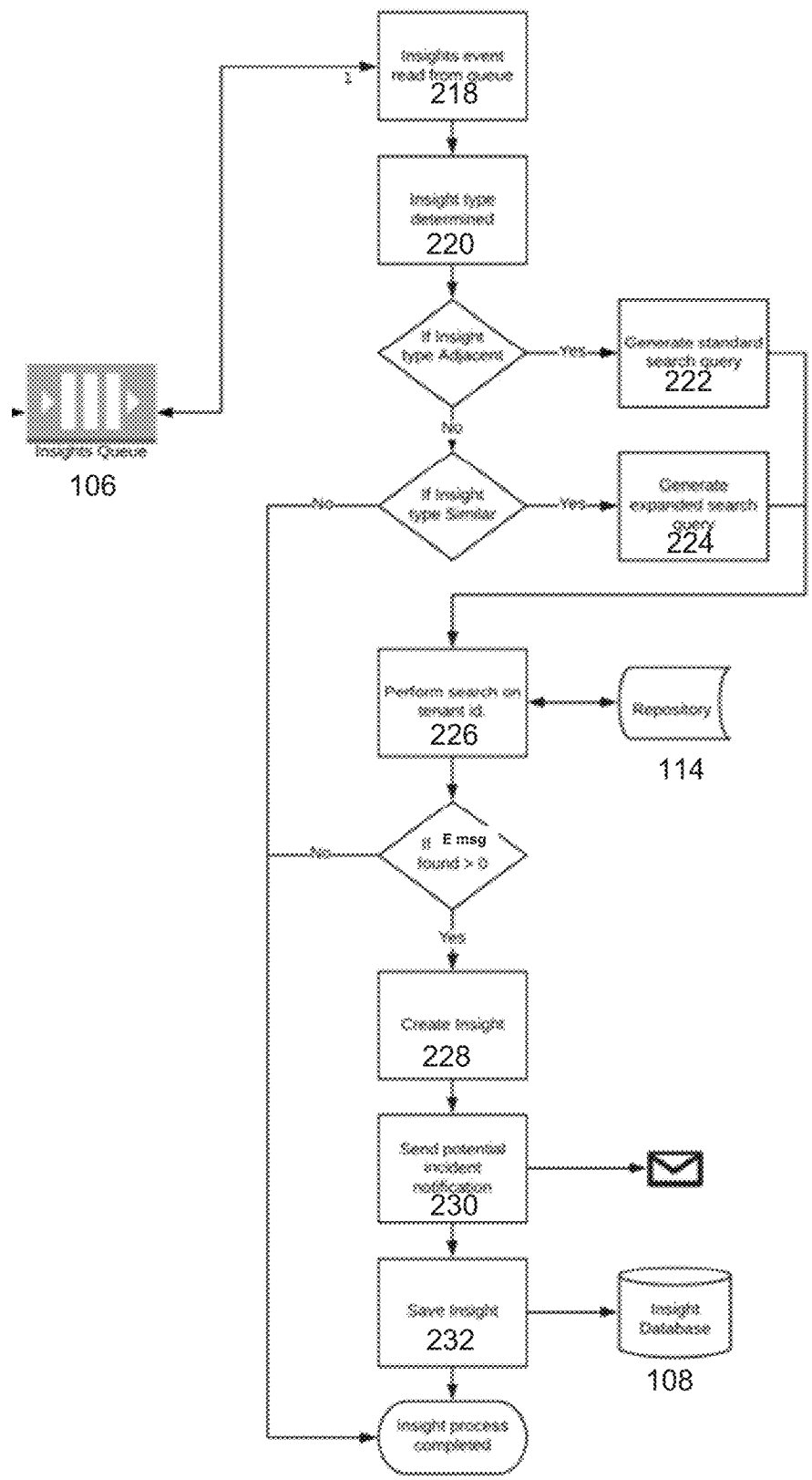
FIG. 2B depicts a flowchart of an example of a process to support automatic insights generation according to some embodiments.

FIG. 2B depicts a flowchart of an example of a process to support automatic insights generation. In the example of FIG. 2B, the flowchart 200 continues to step 218, where an insight event is retrieved from the insights queue 106 for processing. The type of the retrieved insight event is determined at step 220. If it is an adjacent type of insight event, a standard search query is created at step 222. If it is a similar type of insight event, an expanded search query is created at step 224. A search is then conducted based on the search query on electronic messages retrieved from the repository 114 for the tenant ID of the insight event at step 226. If un-remediated malicious electronic messages are found, new insight is automatically generated at step 228 and a notification on potential new incident is sent at step 230. the flowchart 200 ends at step 232, where the newly created insight is saved to the insight database 108.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for a non-limiting example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support autonomous attack identification, comprising:
   a remediation engine configured to
      accept an incident creation request for a detected attack via a suspicious electronic message at one user account with one tenant on an electronic communication platform;
      create an incident for the detected attack and collect electronic messages related to the incident from a repository;
      automatically generate a plurality of insight events based on the detected attack and insert the plurality of insight events to an insights queue, the insights queue is a queuing service wherein the plurality of insight events are placed into by the remediation engine and removed by the insights engine in a first in first out (FIFO) order;
      remediate the detected attack and a set of un-remediated attacks against user accounts in the same or different tenants on the electronic communication platform, wherein the set of un-remediated attacks share one or more characteristics with the detected attack or happen to other tenants on the electronic communication platform;
   an insights engine configured to
      retrieve each of the plurality of insight events from the insights queue;
      search the repository to identify said set of un-remediated attacks against the user accounts of the same or different tenants on the electronic communication platform for each of the plurality of insight events;
      automatically generate and report insight on the set of un-remediated attacks.

2. The system of claim 1, wherein:
the suspicious electronic message is an email, a text message, an online chat, or an instant message.

3. The system of claim 1, wherein:
the suspicious electronic message is a voice message converted to an electronic text format.

4. The system of claim 1, wherein:
the remediation engine is configured to utilize an entire pool of related data stored in a remediation database of incidents of attacks happened in the past or behind the scenes to identify or detect the attack received at the one user account.

5. The system of claim 1, wherein:
the repository is a cloud-based archiving service that enables secured preserving, searching, and accessing of metadata and content of electronic messages of the users within a plurality of tenants on the electronic communication platform in the cloud.

6. The system of claim 1, wherein:
the remediation engine is configured to create one insight event for the incident of the detected attack in order to gain insights on other attacks happening in the one tenant.

7. The system of claim 1, wherein:
the remediation engine is configured to
   retrieve a set of active tenant identifications and related account data from an account database one at a time;
   create one insight event for each of the active tenant identifications in order to gain insights on other attacks happening in those tenants.

8. The system of claim 1, wherein:
the remediation engine is configured to preemptively prevent attacks on the user accounts before the attacks actually happen or cause any damages to the users by taking the one or more remedial measures.

9. The system of claim 1, wherein:
the automatically-generated insight informs the tenant of attacks that have not been reported or detected by an administrator and/or user of the tenant.

10. The system of claim 1, wherein:
the insights engine is configured to automatically generate two types of insight, a similar insight on similar attacks that share the one or more characteristics with the detected attack and an adjacent insight on attacks happening to other tenants on the electronic communication platform.

11. The system of claim 10, wherein:
the insights engine is configured to conduct an expanded search by adjusting search criteria to include and detect the similar attacks happened in the past in the entity that have been missed.

12. The system of claim 11, wherein:
the insights engine is configured to loosen or expand the search criteria for identifying the similar attacks to include variance of the detected attack in order to search for attacks in other user accounts that are not identical to the detected attack.

13. The system of claim 12, wherein:
the one or more characteristics include one or more of frequency, tone, and speed of a voice message.

14. The system of claim 10, wherein:
the similar attacks happen in accounts owned by other users of the tenant based on likelihood that these accounts face similar attacks.

15. The system of claim 10, wherein:
the similar attacks are originated by different senders from the same domain or a different domain from the detected attack.

16. The system of claim 10, wherein:
the insights engine is configured to conduct an expanded search of the entire repository containing electronic communications at multiple tenants to identify adjacent attacks of the detected attack that have happened at other tenants on the electronic communication platform for the adjacent insight.

17. The system of claim 1, wherein:
the one or more characteristics include one or more of sender and/or recipient address, content pattern, intent, and type of an emails or text message.

18. A method to support autonomous attack identification, comprising:
   accepting an incident creation request for a detected suspicious electronic message-borne attack at one user account with one tenant on an electronic communication platform;

creating an incident for the detected attack and collect electronic messages related to the incident from a repository;

automatically generating a plurality of insight events based on the detected attack and insert the plurality of insight events to an insights queue, wherein the insights queue is a queuing service wherein the plurality of insight events are placed into by the remediation engine and removed by the insights engine in a first in first out (FIFO) order;

retrieving each of the plurality of insight events from the insights queue;

searching the repository to identify a set of un-remediated attacks against user accounts of the same or different tenants on the electronic communication platform for each of the insight events, wherein the set of un-remediated attacks share one or more characteristics with the detected attack or happen to other tenants on the electronic communication platform;

automatically generating and report insight on the set of un-remediated attacks, wherein the automatically-generated insight informs the tenant of attacks that have not been reported or detected by an administrator and/or user of the tenant;

remediating the detected attack and the set of un-remediated attacks against the user accounts in the same or different tenants on the electronic communication platform that share one or more characteristics with the detected attack.

19. The method of claim 18, further comprising:
utilizing an entire pool of related data stored in a remediation database of incidents of attacks happened in the past or behind the scenes to identify or detect the attack received at the one user account.

20. The method of claim 18, further comprising:
creating one similar insight event for the incident of the detected attack in order to gain insights on attacks happening in the one tenant that share a common attribute with the detected attack.

21. The method of claim 18, further comprising:
retrieving a set of active tenant identifications and related account data from an account database one at a time;
creating one adjacent insight event for each of the active tenant identifications in order to gain insights on attacks happening in those tenants.

22. The method of claim 18, further comprising:
preemptively preventing attacks on the user accounts before the attacks actually happen or cause any damages to the users by taking the one or more remedial measures.

23. The method of claim 18, further comprising:
automatically generating two types of insight, a similar insight on similar attacks that share the one or more characteristics with the detected attack and an adjacent insight on attacks happening to other tenants on the electronic communication platform.

24. The method of claim 23, further comprising:
conducting an expanded search for attacks related to the detected attack inside the tenant for similar insight by adjusting search criteria to include and detect the similar attacks happened in the past in the entity that have been missed.

25. The method of claim 24, further comprising:
loosening or expanding the search criteria for identifying the similar attacks to include variance of the detected attack in order to search for attacks in other user accounts that are not identical to the detected attack, wherein the loosened search criteria cover similarity in a set of electronic message characteristics.

26. The method of claim 23, further comprising:
conducting an expanded search of the entire repository containing electronic communications at multiple tenants to identify the same or similar attacks to the detected attack that have happened at other tenants on the electronic communication platform for the adjacent insight.

* * * * *